US012580926B2

(12) United States Patent
Hirano et al.

(10) Patent No.: US 12,580,926 B2
(45) Date of Patent: Mar. 17, 2026

(54) ANOMALY MONITORING APPARATUS AND ANOMALY MONITORING METHOD

(71) Applicant: Panasonic Intellectual Property Corporation of America, Torrance, CA (US)

(72) Inventors: Ryo Hirano, Kanagawa (JP); Takeshi Kishikawa, Osaka (JP); Yoshihiro Ujiie, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 365 days.

(21) Appl. No.: 18/112,246

(22) Filed: Feb. 21, 2023

(65) Prior Publication Data

US 2023/0208859 A1      Jun. 29, 2023

Related U.S. Application Data

(63) Continuation of application No. PCT/JP2021/025869, filed on Jul. 8, 2021.

(30) Foreign Application Priority Data

Sep. 1, 2020    (WO) .................. PCT/JP2020/033122

(51) Int. Cl.
*H04L 9/40*         (2022.01)
*H04L 67/12*        (2022.01)
(52) U.S. Cl.
CPC .......... *H04L 63/1416* (2013.01); *H04L 67/12* (2013.01)
(58) Field of Classification Search
CPC ........................... H04L 63/1416; H04L 67/12; H04L 2463/146
See application file for complete search history.

(56) References Cited

U.S. PATENT DOCUMENTS 10,581,903 B2 *   3/2020   Donahue ............. H04L 63/0236
2005/0278779 A1 *  12/2005  Koppol ............... H04L 63/1458
                                                    726/22

(Continued)

FOREIGN PATENT DOCUMENTS

JP          5664799        2/2015
JP        2017-539018      12/2017
(Continued)

OTHER PUBLICATIONS

International Search Report issued in International Pat. Appl. No. PCT/JP2020/033122, dated Nov. 24, 2020, along with an English translation thereof.

(Continued)

*Primary Examiner* — Hieu T Hoang
(74) *Attorney, Agent, or Firm* — Greenblum & Bernstein, P.L.C.

(57) ABSTRACT

An anomaly monitoring apparatus in a remote operation system for remotely operating a mobility entity includes: a log collector that collects an operation log from an operation apparatus which remotely operates the mobility entity and a control log from a control apparatus installed in the mobility entity; an anomaly detector that detects whether an anomaly is present in the mobility entity based on at least one of the operation log or the control log; an attack origin identifier that, when the anomaly detector detects an anomaly, identifies an attack origin that caused the anomaly in the mobility entity from among a plurality of attack origins based on a result of comparing the operation log with the control log; and an anomaly notifier that makes a notification for taking a countermeasure for the attack origin identified by the attack origin identifier.

8 Claims, 16 Drawing Sheets

| Time | Operation command | Control command | Location information |
|---|---|---|---|
| T1 | Move right | Move right | X + 1, Y, Z |
| T2 | Move left | Move left | X, Y, Z |
| T3 | Turn right | Turn right | X, Y, Z |
| T4 | Turn left | Action C (anomaly) | X, Y, Z |
| T5 | Move forward | Move forward | X, Y + 1, Z |
| T6 | Move backward | Move backward | X, Y + 3, Z (anomaly) |
| T7 | Action A | Action A | X, Y + 3, Z |
| T8 | Action B (anomaly) | Action B | X, Y + 3, Z |
| D1 (T1 - T8) | 0xABCD | 0xEFGH | — |

(56)  References Cited

U.S. PATENT DOCUMENTS

| | | | |
|---|---|---|---|
| 2008/0016564 A1* | 1/2008 | Claudatos | G06F 21/568 |
| | | | 726/22 |
| 2010/0218250 A1* | 8/2010 | Mori | H04L 63/1441 |
| | | | 709/224 |
| 2014/0328352 A1 | 11/2014 | Mabuchi et al. | |
| 2017/0004662 A1* | 1/2017 | Gong | G07C 5/004 |
| 2018/0351980 A1* | 12/2018 | Galula | H04W 12/12 |
| 2019/0227949 A1* | 7/2019 | Bernat | G06F 11/3476 |
| 2019/0303789 A1* | 10/2019 | Nishino | G06F 40/40 |
| 2019/0371085 A1* | 12/2019 | Kishikawa | G08G 1/0112 |
| 2020/0051434 A1 | 2/2020 | Sasaki | |
| 2020/0137099 A1 | 4/2020 | Haga et al. | |
| 2021/0092153 A1* | 3/2021 | Wei | H04L 47/29 |

FOREIGN PATENT DOCUMENTS

| | | |
|---|---|---|
| JP | 2019-129529 | 8/2019 |
| JP | 2019-174426 | 10/2019 |
| WO | 2013/094072 | 6/2013 |
| WO | 2016/154937 | 10/2016 |
| WO | 2019/021922 | 1/2019 |

OTHER PUBLICATIONS

International Search Report issued in International Pat. Appl. No. PCT/JP2021/025869, dated Sep. 14, 2021, along with an English translation thereof.

* cited by examiner

FIG. 5

| Time | Operation command |
|------|-------------------|
| T1 | Move right |
| T2 | Move left |
| T3 | Turn right |
| T4 | Turn left |
| T5 | Move forward |
| T6 | Move backward |
| T7 | Action A |
| T8 | Action B (anomaly) |

FIG. 6

| Time | Control command |
|------|-----------------|
| T1 | Move right |
| T2 | Move left |
| T3 | Turn right |
| T4 | Action C (anomaly) |
| T5 | Move forward |
| T6 | Move backward |
| T7 | Action A |
| T8 | Action B |

FIG. 7

| Time | Location information |
|------|---------------------|
| T1 | X + 1, Y, Z |
| T2 | X, Y, Z |
| T3 | X, Y, Z |
| T4 | X, Y, Z |
| T5 | X, Y + 1, Z |
| T6 | X, Y + 3, Z (anomaly) |
| T7 | X, Y + 3, Z |
| T8 | X, Y + 3, Z |

FIG. 8

| Time | Operation command | Control command | Location information |
|---|---|---|---|
| T1 | Move right | Move right | X + 1, Y, Z |
| T2 | Move left | Move left | X, Y, Z |
| T3 | Turn right | Turn right | X, Y, Z |
| T4 | Turn left | Action C (anomaly) | X, Y, Z |
| T5 | Move forward | Move forward | X, Y + 1, Z |
| T6 | Move backward | Move backward | X, Y + 3, Z (anomaly) |
| T7 | Action A | Action A | X, Y + 3, Z |
| T8 | Action B (anomaly) | Action B | X, Y + 3, Z |
| D1 (T1 - T8) | 0xABCD | 0xEFGH | — |

FIG. 9

| No. | Type | Rule | Anomaly location |
|---|---|---|---|
| 1 | Operation log & control log | Operation command and control command from same time do not match | Control log |
| 2 | Operation log | Unauthorized operation command input | Operation log |
| 3 | Operation log | Context at time of operation command differs | Operation log |
| 4 | Operation log | Operation command different from usual behavior | Operation log |
| 5 | Control log | Unauthorized control command executed | Control log |
| 6 | Control log | Context at time of control command differs | Control log |
| 7 | Control log | Control command different from usual behavior | Control log |
| 8 | Location log | Moved distance exceeding vehicle capabilities | Location log |
| 9 | Control log & location log | Change in location information different from control command | Location log |

FIG. 10

| No. | Rule | Attack origin |
|-----|------|---------------|
| 1 | Operation command and control command from same time do not match | Communication path |
| 2 | Anomaly occurred in both operation log and control log | Operator |
| 3 | Anomaly occurred in location log only | Close proximity |

FIG. 11

| Attack origin | Rule |
|---|---|
| Communication path | Stop remote control function of vehicle control apparatus |
| Operator | Revoke operator's access permissions to vehicle operation apparatus |
| Close proximity | Make warning in periphery of vehicle control apparatus |

FIG. 15

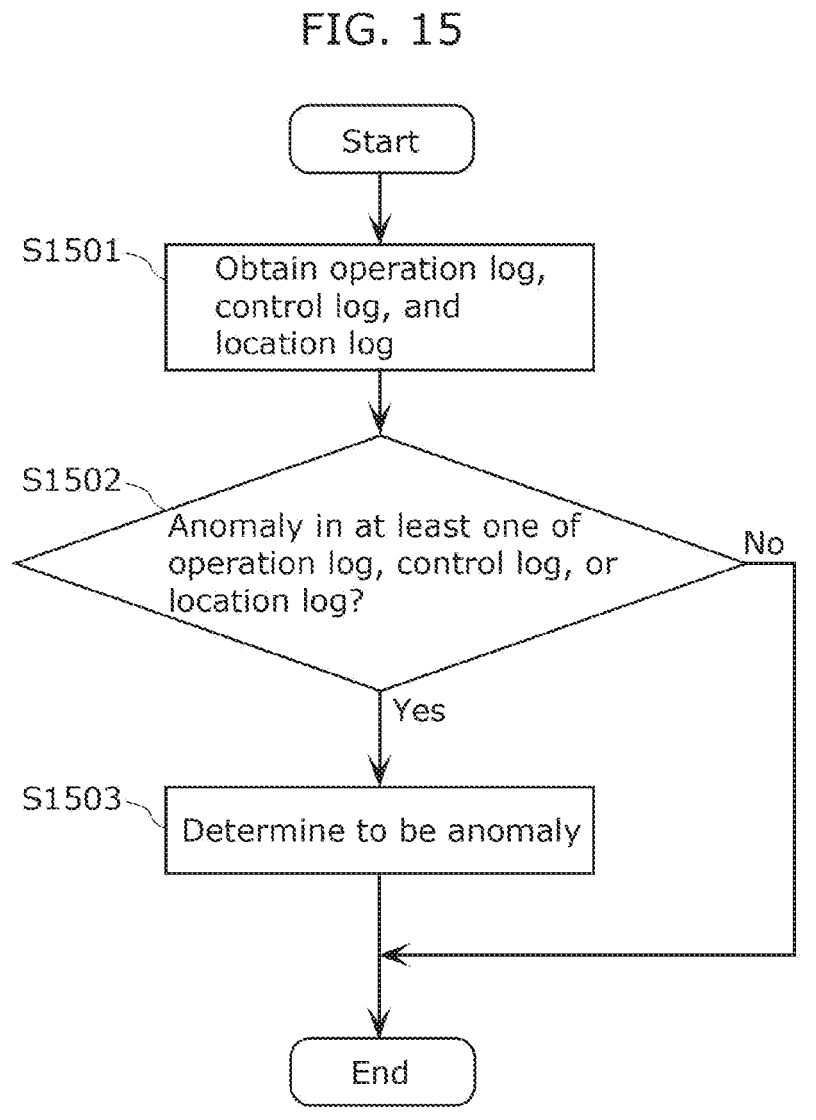

```
                    ┌──────────┐
                    │  Start   │
                    └──────────┘
                          │
                          ▼
S1501 ┌─────────────────────────────┐
      │ Obtain operation log,       │
      │ control log, and            │
      │ location log                │
      └─────────────────────────────┘
                          │
                          ▼
S1502        ◇ Anomaly in at least one of        No
             ◇ operation log, control log, or  ──────┐
             ◇ location log?                         │
                          │                          │
                         Yes                         │
                          │                          │
                          ▼                          │
S1503 ┌─────────────────────────────┐               │
      │ Determine to be anomaly     │               │
      └─────────────────────────────┘               │
                          │                          │
                          │◄─────────────────────────┘
                          ▼
                    ┌──────────┐
                    │   End    │
                    └──────────┘
```

ANOMALY MONITORING APPARATUS AND ANOMALY MONITORING METHOD

CROSS REFERENCE TO RELATED APPLICATIONS

This is a continuation application of PCT International Application No. PCT/JP2021/025869 filed on Jul. 8, 2021, designating the United States of America, which is based on and claims priority of PCT International Application No. PCT/JP2020/033122 filed on Sep. 1, 2020. The entire disclosures of the above-identified applications, including the specifications, drawings and claims are incorporated herein by reference in their entirety.

FIELD

The present disclosure relates to an anomaly monitoring apparatus and an anomaly monitoring method that monitor for anomalies in a remote operation system capable of remotely operating a mobility entity.

BACKGROUND

The recent introduction of autonomous mobility, including self-driving vehicles and the like, is expected to solve driver shortages, achieve a society with zero accidents, and the like. However, home delivery applications require door-to-door autonomous travel, both on highways and public roads as well as on small roads and gravel roads, and building systems for autonomous mobility is therefore challenging.

Accordingly, until fully-autonomous mobility is achieved, remote operation systems have been proposed in which an operator controls a mobility entity remotely according to where the mobility entity is moving.

In remote operation systems, when a mobility entity performs an anomalous operation and causes property damage or personal injury, it is necessary to analyze the cause of the accident. PTL 1, for example, discloses a method for detecting anomalies by monitoring frames flowing on a network in a vehicle as a method for detecting cyber attacks, which are one cause of accidents.

CITATION LIST

Patent Literature

PTL 1: Japanese Patent No. 5664799

SUMMARY

Technical Problem

However, with remote operation systems, there is a problem in that it is not possible to determine whether an anomalous frame detected on a network in a mobility entity (e.g., in a vehicle) is an anomalous frame caused by an anomalous operation by the operator, or an anomalous frame caused by a cyber attack. In other words, when the technique of PTL 1 is used in a remote operation system, it may not be possible to identify the cause of an anomaly.

Accordingly, the present disclosure provides an anomaly monitoring apparatus and an anomaly monitoring method capable of identifying the cause of an anomaly in a mobility entity.

Solution to Problem

To solve the aforementioned problem, an anomaly monitoring apparatus according to one aspect of the present disclosure is an anomaly monitoring apparatus in a remote operation system for remotely operating a mobility entity. The anomaly monitoring apparatus includes: a log collector that collects an operation log from an operation apparatus which remotely operates the mobility entity and a control log from a control apparatus installed in the mobility entity, the operation log being a history of operation commands, and the control log being a history of control commands; an anomaly detector that detects whether an anomaly is present in the mobility entity based on at least one of the operation log or the control log; an attack origin identifier that, when the anomaly detector detects an anomaly, identifies an attack origin that caused the anomaly in the mobility entity from among a plurality of attack origins based on a result of comparing the operation log with the control log; and an anomaly notifier that makes a notification for taking a countermeasure for the attack origin identified by the attack origin identifier.

To solve the aforementioned problem, an anomaly monitoring method according to one aspect of the present disclosure is an anomaly monitoring method performed in a remote operation system for remotely operating a mobility entity. The anomaly monitoring method includes: collecting an operation log from an operation apparatus which remotely operates the mobility entity and which is installed in the mobility entity, and a control log from a vehicle control apparatus, the operation log being a history of operation commands, and the control log being a history of control commands; detecting whether an anomaly is present in the mobility entity based on at least one of the operation log or the control log; identifying, when an anomaly is detected in the detecting, an attack origin that caused the anomaly in the mobility entity from among a plurality of attack origins based on a result of comparing the operation log with the control log; and making a notification for taking a countermeasure for the attack origin identified in the identifying.

Advantageous Effects

According to one aspect of the present disclosure, an anomaly monitoring apparatus and an anomaly monitoring method capable of identifying the cause of an anomaly in a mobility entity can be realized.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a diagram illustrating an example of an operation log according to an embodiment.

FIG. 6 is a diagram illustrating an example of a control log according to an embodiment.

FIG. 7 is a diagram illustrating an example of a location log according to an embodiment.

FIG. 8 is a diagram illustrating an example of logs according to an embodiment.

FIG. 9 is a diagram illustrating an example of anomaly detection rules according to an embodiment.

FIG. 10 is a diagram illustrating an example of attack origin determination rules according to an embodiment.

FIG. 11 is a diagram illustrating an example of anomaly countermeasure rules according to an embodiment.

FIG. 15 is a diagram illustrating a flowchart for anomaly detection processing according to an embodiment.

DESCRIPTION OF EMBODIMENTS

Circumstances Leading to the Present Disclosure

Figure 1:
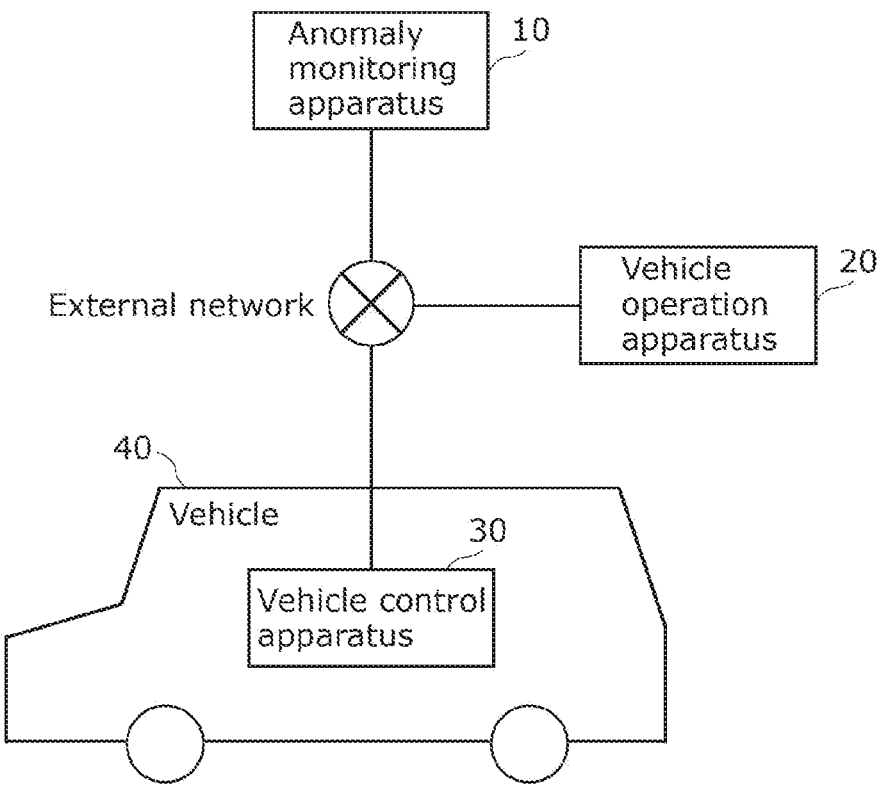
FIG. 1 is a diagram illustrating the overall configuration of a vehicle remote operation system according to an embodiment.

As described in the Background Art section, until fully-autonomous mobility is achieved, remote operation systems have been proposed in which an operator controls a mobility entity remotely (remote operation) according to where the mobility entity is moving. Even after fully-autonomous mobility is achieved, it is conceivable that autonomous travel of mobility entities may be determined to be dangerous in the event of a malfunction or a cyber attack, and thus a remote operation system may be needed to remotely operate the mobility entities.

Physical attacks, anomalous operations by operators, cyber attacks, and the like are conceivable as causes of accidents in remote operation systems.

A physical attack on a mobility entity is, for example, an attack in which a malicious third party physically approaches the mobility entity and rolls the device over. An anomalous operation by an operator is, for example, an attack in which a malicious operator rolls the mobility entity over. A cyber attack is, for example, an attack in which an attacker spoofs communication between the mobility entity and the operator to roll the mobility entity over. Note, however, that the attack is not limited to rolling the mobility entity over.

With the technique of PTL 1, a situation may arise where the presence or absence of an anomaly can be determined but the cause of the anomaly cannot be identified. Accordingly, the inventors of this application made diligent studies into anomaly monitoring apparatuses and anomaly monitoring methods capable of identifying the source of an anomaly in a remote operation system, and arrived at the anomaly monitoring apparatus and the anomaly monitoring method described hereinafter.

Specifically, the inventors of this application found that in a remote operation system, an anomaly monitoring apparatus can determine whether the cause of an anomaly is a cyber attack or an anomalous operation by an operator by collecting and comparing a control log of a mobility entity and an operation log of the operator, and arrived at the anomaly monitoring apparatus and the anomaly monitoring method described hereinafter.

An anomaly monitoring apparatus according to one aspect of the present disclosure is an anomaly monitoring apparatus in a remote operation system for remotely operating a mobility entity. The anomaly monitoring apparatus comprising: a log collector that collects an operation log from an operation apparatus which remotely operates the mobility entity and a control log from a control apparatus installed in the mobility entity, the operation log being a history of operation commands, and the control log being a history of control commands; an anomaly detector that detects whether an anomaly is present in the mobility entity based on at least one of the operation log or the control log; an attack origin identifier that, when the anomaly detector detects an anomaly, identifies an attack origin that caused the anomaly in the mobility entity from among a plurality of attack origins based on a result of comparing the operation log with the control log; and an anomaly notifier that makes a notification for taking a countermeasure for the attack origin identified by the attack origin identifier.

Through this, the anomaly monitoring apparatus can identify the attack origin according to the anomaly in the mobility entity from among a plurality of attack origins, according to the result of comparing the operation log with the control log, e.g., can identify the cause of the anomaly in the mobility entity. As such, according to one aspect of the present disclosure, an anomaly monitoring apparatus capable of identifying the cause of an anomaly in a mobility entity can be realized. Additionally, by taking countermeasures based on the cause of the anomaly communicated by the anomaly notifier, attacks can be suppressed effectively.

Additionally, for example, the anomaly detector may further detect a presence or absence of an anomaly in each of the operation log and the control log based on a first rule; and the attack origin identifier may further identify a first attack origin as the attack origin when the operation log and the control log do not match, and identify a second attack origin, different from the first attack origin, as the attack origin when an anomaly is detected in both the operation log and the control log.

Through this, the anomaly monitoring apparatus can determine that the attack comes from different attack origins (the first attack origin and the second attack origin) between when the operation log and the control log do not match, and when an anomaly is detected in both the operation log and the control log. For example, when the operation log and the control log do not match, it is highly likely that an operation command from an operator has been tampered with in the communication path between the operation apparatus and the control apparatus, and then executed in the mobility entity. Additionally, for example, when an anomaly is detected in both the operation log and the control log, it is highly likely that a malicious operator has input an anomalous operation command and an anomalous control command has been executed in the mobility entity. Accordingly, the anomaly monitoring apparatus can appropriately identify the cause of the anomaly in the mobility entity both when the operation log and the control log do not match, and when an anomaly is detected in both the operation log and the control log.

Additionally, for example, the log collector may further collect a location log from the control apparatus, the location log being a history of location information of the mobility entity; the first rule may further include information pertaining to an anomaly in the location log; the anomaly detector may detect an anomaly in each of the operation log, the control log, and the location log based on the first rule; and the attack origin identifier may identify a third attack origin, different from the first attack origin and the second attack origin, as the attack origin when an anomaly is present in only the location log.

Through this, the anomaly monitoring apparatus can further determine another attack origin (the third attack origin) when an anomaly is detected in neither the operation log nor the control log but an anomaly is detected in only the location log. For example, when an anomaly is detected in only the location log, it is highly likely that a third party has physically approached the mobility entity and caused an anomaly in the mobility entity. Accordingly, the anomaly monitoring apparatus can appropriately identify the cause of the anomaly in the mobility entity when an anomaly is detected in only the location log among the operation log, the control log, and the location log.

Additionally, for example, the first attack origin may include a malicious operation command being inserted into a communication path between the operation apparatus and the control apparatus; the second attack origin may include an operator, who uses the operation apparatus, transmitting a malicious operation command; the third attack origin may include a third party physically attacking the mobility entity; and the anomaly notifier may stop a remote control function of the control apparatus when the attack origin is determined to be the first attack origin, revoke access permission of the operator to the operation apparatus when the attack origin is determined to be the second attack origin, and make a notification for performing a warning to a periphery of the control apparatus when the attack origin is determined to be the third attack origin.

Through this, the anomaly monitoring apparatus can select and execute effective countermeasures according to the attack origin that is determined. Specifically, for the first attack origin (the communication path), by stopping the remote control function of the mobility entity (an example of a countermeasure for the first attack origin), the anomaly monitoring apparatus can effectively suppress attacks made through the communication path. Additionally, for the second attack origin (the operator), by revoking the operator's access permissions to the operation apparatus (an example of a countermeasure for the second attack origin), the anomaly monitoring apparatus can effectively suppress attacks made by the operator. Additionally, for the third attack origin (close proximity), by making a warning to the periphery of the control apparatus using a warning alarm or the like (an example of a countermeasure for the third attack origin), the anomaly monitoring apparatus can effectively suppress attacks made by a malicious third party in close proximity to the mobility entity.

Additionally, for example, the log collector may further collect a hash value of the operation log and a hash value of the control log; and the anomaly detector may detect an anomaly when the hash value of the operation log and the hash value of the control log do not match.

Through this, whether the operation log and the control log match can be determined by comparing the hash values. In other words, the amount of processing required for the determination processing can be reduced. As such, the operation log and the control log can be compared efficiently while reducing the amount of processing in the anomaly monitoring apparatus.

Additionally, for example, the first rule may include information indicating that an anomaly is present in the control log when the operation log and the control log do not match.

Through this, when the operation log and the control log do not match, the anomaly monitoring apparatus can identify an anomaly in the control log, among the operation log and the control log, based on the first rule.

Additionally, for example, the first rule may include information indicating that an anomaly is present in the location log when the location log includes information indicating a change in the location information that is different from the control log.

Through this, when the location log contains information indicating a change in location information different from the control log, the anomaly monitoring apparatus can identify an anomaly in the location log, among the operation log, the control log, and the location log, based on the first rule.

Additionally, for example, the attack origin identifier may identify an attack origin that caused the anomaly in the mobility entity based on (i) the operation log and the control log and (ii) a second rule; the second rule may include (i) the attack origin being a communication path between the operation apparatus and the control apparatus when the operation command and the control command from an identical time do not match and (ii) the attack origin being an operator using the operation apparatus when an anomaly is detected in both the operation log and the control log.

Through this, the attack origin identifier can easily identify the attack origin based on the second rule.

To solve the aforementioned problem, an anomaly monitoring method according to one aspect of the present disclosure is an anomaly monitoring method performed in a remote operation system for remotely operating a mobility entity. The anomaly monitoring method includes: collecting an operation log from an operation apparatus which remotely operates the mobility entity and which is installed in the mobility entity, and a control log from a vehicle control apparatus, the operation log being a history of operation commands, and the control log being a history of control commands; detecting whether an anomaly is present in the mobility entity based on at least one of the operation log or the control log; identifying, when an anomaly is detected in the detecting, an attack origin that caused the anomaly in the mobility entity from among a plurality of attack origins based on a result of comparing the operation log with the control log; and making a notification for taking a countermeasure for the attack origin identified in the identifying.

This provides the same effects as the above-described anomaly monitoring apparatus.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, or recording media.

An anomaly monitoring apparatus according to an embodiment will be described hereinafter with reference to the drawings. Each of the following embodiments describes a specific example of the present disclosure. As such, the numerical values, constituent elements, arrangements and connection states of constituent elements, steps serving as elements of processing, orders of steps, and the like in the following embodiments are merely examples, and are not intended to limit the present disclosure. Additionally, of the constituent elements in the following embodiments, constituent elements not denoted in the independent claims are considered to be optional constituent elements.

Additionally, the drawings are schematic diagrams, and are not necessarily exact illustrations. As such, the scales and so on, for example, are not necessarily consistent from drawing to drawing. Furthermore, configurations that are substantially the same are given the same reference signs in the drawings, and redundant descriptions will be omitted or simplified.

Additionally, in the present specification, terms indicating relationships between elements, such as "the same" and "identical", numerical values, and numerical value ranges do not express the items in question in the strictest sense, and also include substantially equivalent ranges, e.g., differences of approximately several percent (e.g., approximately 10%), as well.

Embodiment

Overall Configuration of Vehicle Remote Operation System

FIG. 1 is a diagram illustrating the overall configuration of a vehicle remote operation system according to the present embodiment. In the present embodiment, vehicle 40 will be described as an example of a mobility entity. Vehicle 40 is electrically powered, for example.

In FIG. 1, the vehicle remote operation system includes anomaly monitoring apparatus 10, vehicle operation apparatus 20, and vehicle control apparatus 30. The vehicle remote operation system is a system for remotely operating (remotely controlling) vehicle 40 (an example of a mobility entity), and is an example of a remote operation system capable of remote operation.

Anomaly monitoring apparatus 10 is connected to vehicle operation apparatus 20 and vehicle control apparatus 30 over an external network such as the Internet. Here, the connections to the external network may be wired or wireless, and vehicle operation apparatus 20 and vehicle control apparatus 30 may be connected to a local area network, such as a 5G network or a radio network, without being connected over the external network.

Anomaly monitoring apparatus 10 is an apparatus that monitors for anomalies in vehicle operation apparatus 20 and vehicle control apparatus 30. Anomaly monitoring apparatus 10 collects an operation log, which is a history of operation commands from vehicle operation apparatus 20, a control log, which is a history of control commands from vehicle control apparatus 30, and a location log, which is a history of location information of vehicle 40, and monitors these for anomalies. Vehicle control apparatus 30 is a vehicle control apparatus installed in vehicle 40 that is subject to remote operation by vehicle operation apparatus 20.

Here, anomaly monitoring apparatus 10 may monitor a plurality of vehicle operation apparatuses 20 and a plurality of vehicle control apparatuses 30. In other words, the numbers of vehicle operation apparatuses 20 and vehicle control apparatuses 30 included in the vehicle remote operation system are not particularly limited.

Note that "monitoring for an anomaly" includes determining whether there is an anomaly. "Collecting the operation log" means obtaining the operation log from vehicle operation apparatus 20, and "collecting the control log and the location log" means obtaining the control log and the location log from vehicle control apparatus 30.

Vehicle operation apparatus 20 is a remote operation apparatus with which an operator remotely operates vehicle 40, accepting inputs of operation commands from the operator and transmitting the operation commands to vehicle control apparatus 30. Here, vehicle operation apparatus 20 may remotely operate a plurality of vehicles 40 (a plurality of vehicle control apparatuses 30).

Vehicle control apparatus 30 is a control apparatus for controlling vehicle 40 in accordance with the operation commands from vehicle operation apparatus 20, receiving the operation commands from vehicle operation apparatus 20 and executing those commands in vehicle 40.

"Control commands" are commands which control vehicle 40, and for example, the operation commands executed in vehicle 40 are included in control commands. In the following, "control command" means an operation command executed in vehicle 40.

Configuration of Anomaly Monitoring Apparatus 10

Figure 2:
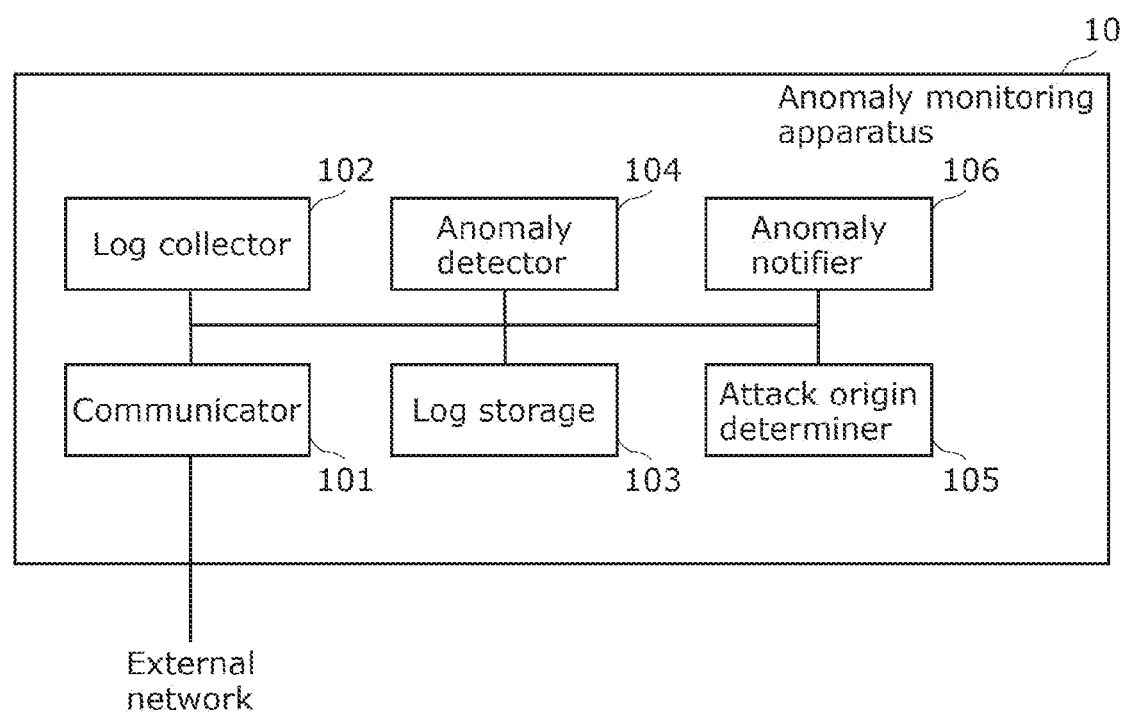
FIG. 2 is a block diagram illustrating the functional configuration of an anomaly monitoring apparatus according to an embodiment.

FIG. 2 is a block diagram illustrating the functional configuration of anomaly monitoring apparatus 10 according to the present embodiment. Anomaly monitoring apparatus 10 is an apparatus used in a vehicle remote operation system such as that illustrated in FIG. 1. In FIG. 2, anomaly monitoring apparatus 10 includes communicator 101, log collector 102, log storage 103, anomaly detector 104, attack origin determiner 105, and anomaly notifier 106.

Communicator 101 communicates with vehicle operation apparatus 20 and vehicle control apparatus 30 over the external network. Communicator 101 is configured including, for example, a communication circuit (communication module).

Log collector 102 receives the operation log from vehicle operation apparatus 20 via communicator 101, and receives the control log and the location log from vehicle control apparatus 30 via communicator 101. Note that it is sufficient for log collector 102 to receive at least the operation log and the control log. For example, it can be said that log collector 102 collects the operation log, which is a history of operation commands from vehicle operation apparatus 20 which remotely operates vehicle 40, and the control log, which is a history of control commands from vehicle control apparatus 30 installed in vehicle 40. The following will describe an example in which log collector 102 collects the operation log, the control log, and the location log.

Log collector 102 collects the operation log, the control log, and the location log from the same period, for example. Although the operation log, the control log, and the location log are collected periodically, for example, the collection timing is not particularly limited.

Log storage 103 stores the received operation log, control log, and location log. Log storage 103 is realized by semiconductor memory or the like, but is not limited thereto.

Anomaly detector 104 detects whether there is an anomaly in vehicle 40 based on at least one of the operation log or the control log. Anomaly detector 104 may detect whether there is an anomaly in vehicle 40 based on at least the operation log and the control log, for example. In the present embodiment, anomaly detector 104 detects an anomaly in vehicle 40 based on anomaly detection rules and the operation log, control log, and location log. The anomaly detection rules and an anomaly detection method will be described in detail later.

Attack origin determiner 105 determines an attack origin based on a result of comparing the operation log with the control log when an anomaly is detected by anomaly detector 104. Attack origin determiner 105 identifies an attack origin for the current anomaly in vehicle 40 from among a plurality of attack origins (a plurality of attack origin candidates) based on the comparison result, for example. Attack origin determiner 105 identifies the attack origin based on anomalous means determination rules, for example. Attack origin determiner 105 is an example of an attack origin identifier. The anomalous means determination rules and an attack origin determination method will be described later.

When anomaly detector 104 detects an anomaly, attack origin determiner 105 may identify the attack origin that caused the anomaly at least in accordance with a difference between the operation log and the control log, for example. Additionally, when anomaly detector 104 detects an anomaly, attack origin determiner 105 may obtain an anomaly log indicating a type of log, among the operation log and the control log, which is assumed to contain the anomaly, and identify the attack origin that is the cause of the anomaly in vehicle 40 in accordance with the obtained anomaly log, for example.

Note that the "attack origin" is information for identifying the origin of an attack, and is information pertaining to the cause of an anomaly in vehicle 40. The attack origin is information including the location where an attack (e.g., tampering with commands, a physical attack, or the like) that caused an anomaly in vehicle 40 was performed (e.g., a communication path or close proximity to vehicle 40), the entity that caused the anomaly in vehicle 40 (e.g., an operator, a third party, or the like), and the like.

Anomaly notifier 106 makes a notification, to at least one of vehicle operation apparatus 20 or vehicle control apparatus 30, for taking a countermeasure according to the attack origin identifies by attack origin determiner 105. For example, anomaly notifier 106 communicates information including the attack origin to vehicle operation apparatus 20 and vehicle control apparatus 30 when an anomaly is detected. Anomaly notifier 106 may notify a driver of vehicle 40 of the anomaly, when the driver occupies vehicle 40, or may notify a security guard near vehicle 40 of the anomaly.

Configuration of Vehicle Operation Apparatus 20

Figure 3:
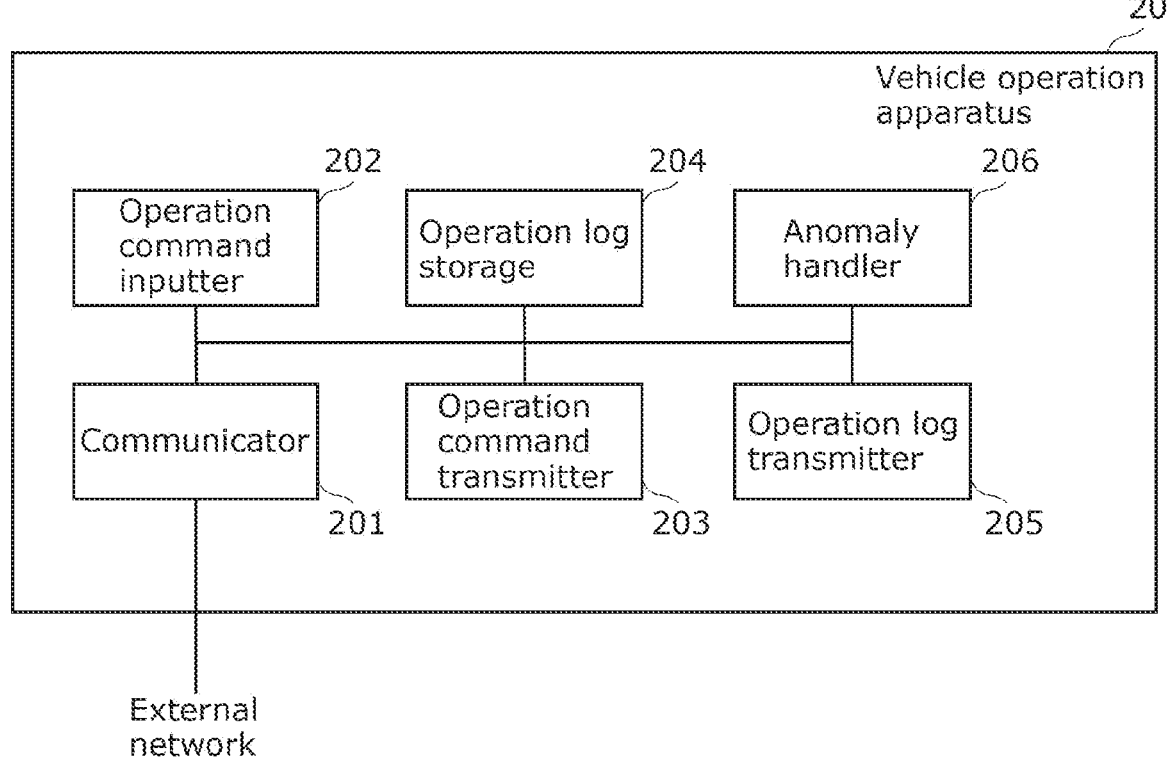
FIG. 3 is a block diagram illustrating the functional configuration of a vehicle operation apparatus according to an embodiment.

FIG. 3 is a block diagram illustrating the functional configuration of vehicle operation apparatus 20 according to the present embodiment. In FIG. 3, vehicle operation apparatus 20 includes communicator 201, operation command inputter 202, operation command transmitter 203, operation log storage 204, operation log transmitter 205, and anomaly handler 206. Vehicle operation apparatus 20 is an example of an operation apparatus.

Communicator 201 communicates with anomaly monitoring apparatus 10 and vehicle control apparatus 30 over the external network. Communicator 201 is configured including, for example, a communication circuit (communication module).

Operation command inputter 202 accepts the input of an operation command instructing control of vehicle 40 from an operator in charge of remotely operating vehicle 40. Here, the operation command may be input by a keyboard, a mouse, or a gaming controller, or may be input by voice. Operation command inputter 202 is realized by a keyboard, a mouse, a gaming controller, a touch panel, a microphone, or the like.

Operation command transmitter 203 transmits the input operation command to vehicle control apparatus 30 via communicator 201.

Operation log storage 204 stores a history of operation commands as an operation log. The operation log will be described in greater detail later. Operation log storage 204 is realized by semiconductor memory or the like, but is not limited thereto.

Operation log transmitter 205 transmits the operation log to anomaly monitoring apparatus 10 via communicator 201.

Anomaly handler 206 receives the determined attack origin from anomaly monitoring apparatus 10, and takes a countermeasure based on the received attack origin and anomaly countermeasure rules indicating countermeasures for each attack origin. Anomaly handler 206 determines the countermeasure to be taken in vehicle operation apparatus 20, for example. The anomaly countermeasure rules will be described in greater detail later.

Note that vehicle operation apparatus 20 may store, in advance, information for identifying anomaly monitoring apparatus 10 that transmits the operation log (e.g., identification information). Additionally, when vehicle 40 to be controlled is determined, vehicle operation apparatus 20 may transmit, to anomaly monitoring apparatus 10, information for identifying that vehicle 40 or vehicle control apparatus 30 installed in that vehicle 40.

Configuration of Vehicle Control Apparatus 30

Figure 4:
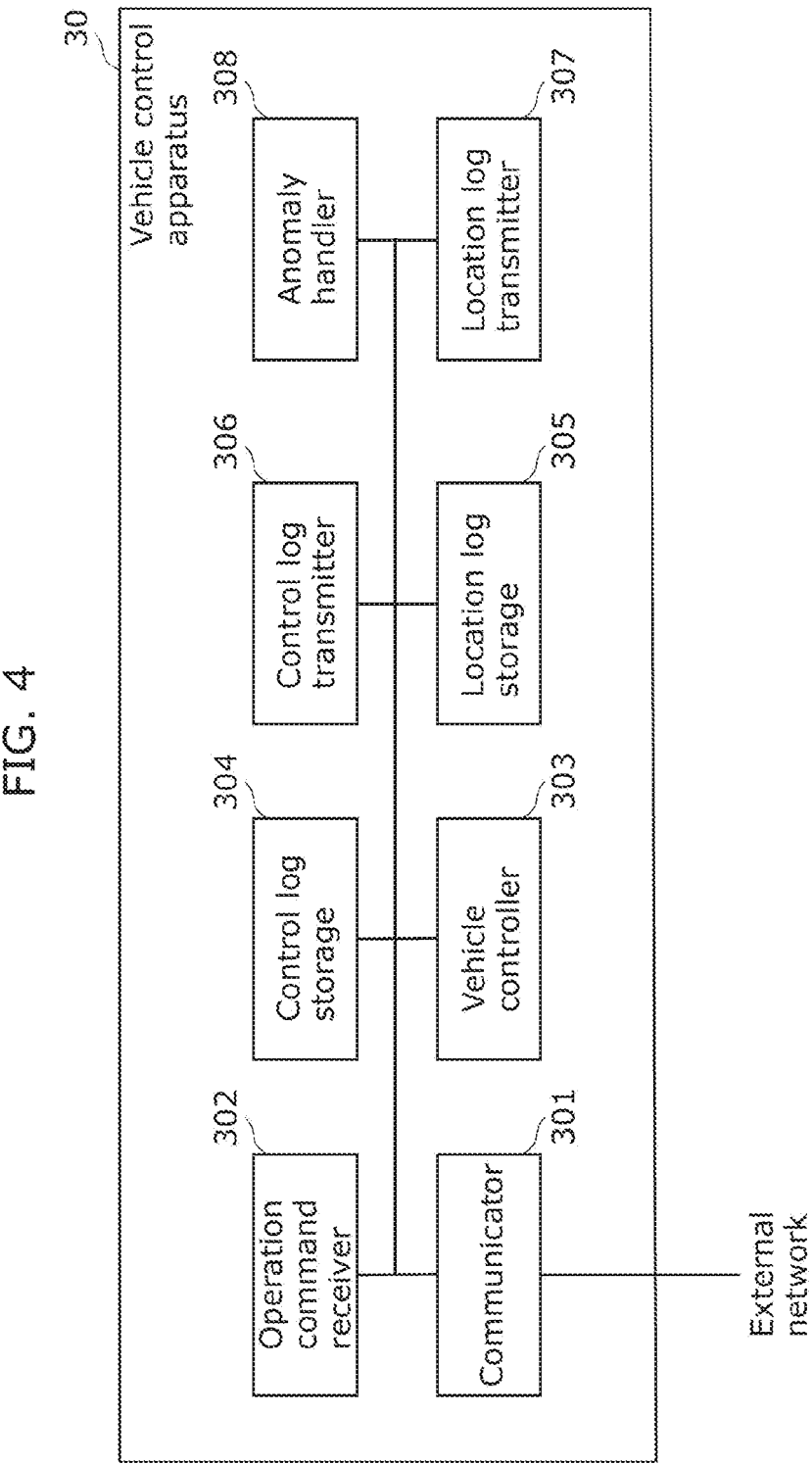
FIG. 4 is a block diagram illustrating the functional configuration of a vehicle control apparatus according to an embodiment.

FIG. 4 is a block diagram illustrating the functional configuration of vehicle control apparatus 30 according to the present embodiment. In FIG. 4, vehicle control apparatus 30 includes communicator 301, operation command receiver 302, vehicle controller 303, control log storage 304, location log storage 305, control log transmitter 306, location log transmitter 307, and anomaly handler 308. Vehicle control apparatus 30 is an example of a control apparatus.

Communicator 301 communicates with anomaly monitoring apparatus 10 and vehicle operation apparatus 20 over the external network. Communicator 301 is configured including, for example, a communication circuit (communication module).

Operation command receiver 302 receives operation commands from anomaly monitoring apparatus 10 via communicator 301.

Vehicle controller 303 controls vehicle 40 based on the operation commands. Vehicle controller 303 furthermore obtains location information at the time of vehicle control from a Global Positioning System (GPS) or the like. The control commands will be described in greater detail later.

Control log storage 304 stores a history of control commands as a control log. The control log will be described in greater detail later. Control log storage 304 is realized by semiconductor memory or the like, but is not limited thereto.

Location log storage 305 stores a history of the location information of vehicle 40 as a location log. The location log will be described in greater detail later. Location log storage 305 is realized by semiconductor memory or the like, but is not limited thereto.

Control log transmitter 306 transmits the control log to anomaly monitoring apparatus 10 via communicator 301.

Location log transmitter 307 transmits the location log to anomaly monitoring apparatus 10 via communicator 301.

Anomaly handler 308 receives the determined attack origin from anomaly monitoring apparatus 10, and takes a countermeasure based on the received attack origin and anomaly countermeasure rules indicating countermeasures for each attack origin. Anomaly handler 308 determines the countermeasure to be taken in vehicle control apparatus 30, for example. The anomaly countermeasure rules will be described in greater detail later.

Example of Operation Log

FIG. 5 is a diagram illustrating an example of an operation log according to the present embodiment. The operation log illustrated in FIG. 5 is held (stored) in vehicle operation apparatus 20, for example.

The operation log is configured including times and operation commands. The operation commands are operation commands for vehicle 40, input from an operator through operation command inputter 202. The times are times at which the operation commands are transmitted by operation command transmitter 203.

The operation commands are commands for causing vehicle 40 to move or perform a special operation (e.g., a task when making a delivery). For example, move right, move left, turn right, turn left, move forward, move backward, action A, action B, and the like are written as operation commands.

Move right, move left, turn right, turn left, move forward, and move backward are examples of commands which control the movement of vehicle 40.

Action A and action B are examples of commands which control special operations of vehicle 40, specifically, opening a door of vehicle 40, restarting the system of vehicle 40, making a warning alert to a person approaching vehicle 40, and the like.

The operation command at time T8 includes "(anomaly)", but this is provided to indicate that action B, which is an operation command, has an anomaly, and is not written in the actual operation log.

By obtaining and referring to the operation log, anomaly detector 104 can detect action B being executed despite the operator not having operation permissions for action B as an anomaly, for example. In this case, information pertaining to operations for which the operator does not have permissions is stored in advance in anomaly monitoring apparatus 10. Note that "referring" includes, for example, comparing with a reference or the like.

Additionally, anomaly detector 104 can detect action B being executed despite an operation condition of action B and a state of vehicle 40 not matching as an anomaly, for example. For example, when action B is opening a door of vehicle 40 and an operation condition of action B is that vehicle 40 is stopped, anomaly detector 104 can detect a door of vehicle 40 opening while vehicle 40 is traveling (an example of a state of vehicle 40) as an anomaly. In this case, information pertaining to operation conditions for each action is stored in advance in anomaly monitoring apparatus 10. Anomaly monitoring apparatus 10 also obtains information indicating the current state of vehicle 40 from vehicle control apparatus 30, for example.

Additionally, anomaly detector 104 can detect action B being executed despite the operator not normally executing action B as an anomaly, for example. In this case, anomaly monitoring apparatus 10 may store past operation logs of the operator, and anomaly detector 104 may detect the anomaly by comparing the past operation logs with the current action B.

Example of Control Log

FIG. 6 is a diagram illustrating an example of a control log according to the present embodiment. The control log illustrated in FIG. 6 is held by vehicle control apparatus 30, for example.

The control log is configured including times and control commands. The control commands are operation commands received from an operator via operation command receiver 302 and executed by vehicle controller 303. The times are the times when the control commands are executed by vehicle controller 303.

The control commands are commands that cause vehicle 40 to move or perform a special operation (e.g., a task when making a delivery). For example, move right, move left, turn right, turn left, move forward, move backward, action A, action B, action C, and the like are written as control commands.

Move right, move left, turn right, turn left, move forward, and move backward are examples of commands which control the movement of vehicle 40.

Action A, action B, and action C are commands which control special operations of vehicle 40, specifically, opening a door of vehicle 40, restarting the system of vehicle 40, making a warning alert to a person approaching vehicle 40, and the like.

The control command at time T4 includes "(anomaly)", but this is provided to indicate that the control command has an anomaly, and is not written in the actual control log.

By obtaining and referring to the control log, anomaly detector 104 can detect action C being executed despite vehicle 40 not having operation permissions for action C as an anomaly, for example. In this case, information pertaining to operations for which vehicle 40 does not have permissions is stored in advance in anomaly monitoring apparatus 10.

Additionally, anomaly detector 104 can detect action C being executed despite a control condition of action C and a state of vehicle 40 not matching as an anomaly, for example. In this case, information pertaining to control conditions for each action is stored in advance in anomaly monitoring apparatus 10. Anomaly monitoring apparatus 10 also obtains information indicating the current state of vehicle 40 from vehicle control apparatus 30, for example.

Additionally, anomaly detector 104 can detect action C being executed despite vehicle 40 not normally executing action C as an anomaly, for example. In this case, anomaly monitoring apparatus 10 may store past control logs of vehicle 40, and anomaly detector 104 may detect the anomaly by comparing the past control logs with the current action C.

Example of Location Log

FIG. 7 is a diagram illustrating an example of a location log according to the present embodiment. The location log illustrated in FIG. 7 is held by vehicle control apparatus 30, for example.

The location log is configured including times and location information. The location information is obtained from a GPS or the like, as location information of vehicle 40 when a control command is executed by vehicle controller 303. The times are times when the location information is obtained.

For example, X, Y, Z, and the like are written in the location information, where X indicates latitude, Y indicates longitude, and Z indicates elevation, for example. Note that the location information may be information indicating a relative positional relationship with a reference point, for example.

The location information at time T6 includes "(anomaly)", but this is provided to indicate that the location information has an anomaly, and is not written in the actual location information.

For example, by obtaining and referring to the location log, anomaly detector 104 can detect that vehicle 40 has moved two degrees eastward between time T5 (location information of "X, Y+1, Z") and time T6 (location information of "X, Y+3, Z"). Here, anomaly detector 104 can determine that movement of two degrees despite the travel capabilities of vehicle 40 making it difficult to move two degrees in the period from time T6 to time T5 has resulted from a third party moving vehicle 40 at a speed exceeding the capabilities, and detect this as an anomaly. In this case, information pertaining to the travel capabilities of vehicle 40 in which vehicle control apparatus 30 is installed (e.g., catalog values) is stored in anomaly monitoring apparatus 10 in advance. For example, anomaly monitoring apparatus 10 may store normal ranges of the travel capabilities of vehicle 40 (e.g., normal ranges of changes in speed, acceleration, and steering angle), or normal ranges for travel with respect to control commands (e.g., normal ranges for speed or acceleration when moving forward).

Instead of location information or in addition to location information, anomaly detector 104 may use the speed or acceleration of vehicle 40 as the location log. In this case, vehicle controller 303 obtains the speed or acceleration of vehicle 40 as information from a speed sensor or an accelerometer, and stores that information in location log storage 305 as the location log. Through this, anomaly detector 104 can detect a third party physically impacting vehicle 40 as an anomaly. Although the third party is a person aside from an occupant and the operator of vehicle 40 here, the third party may be another mobility entity (a malicious mobility entity).

Example of Logs

FIG. 8 is a diagram illustrating an example of logs according to the present embodiment. The logs illustrated in FIG. 8 are various types of logs collected by anomaly monitoring apparatus 10, for example. Anomaly monitoring apparatus 10 collects the operation log from vehicle operation apparatus 20, collects the control log and the location log from vehicle control apparatus 30, and stores these logs in log storage 103. In the logs, commands and location information transmitted or obtained in identical periods (e.g., times T1 to T8) are associated with each other.

Each log is configured including a time, an operation command, a control command, and location information, as described in the example of the operation log (FIG. 5), the example of the control log (FIG. 6), and the example of the location log (FIG. 7).

The time the operation command was transmitted, the time the control command was executed, and the time the location information was obtained are used as the respective times, and thus due to communication latency and the like, the times of the operation command, the control command, and the location information do not match perfectly. Accordingly, taking communication latency into account, the times are rounded to the nearest 0.5 second and treated as identical times. For example, an anomaly is determined under the assumption that an operation command and a control command having times different by 0.5 seconds are commands from the same time, e.g., the control command corresponds to the operation command.

Here, 0.5 seconds is an example of a standard for rounding the times, but the standard is not limited to 0.5 seconds, and any predetermined standard for rounding the times may be used.

Additionally, there is an example in which the log includes "(anomaly)", but this is provided to indicate that the log has an anomaly, and is not written in the actual log.

For example, anomaly detector 104 can detect the anomalies described in the example of the operation log by referring to the operation commands included in the log; the anomalies described in the example of the control log, by referring to the control commands included in the log; and the anomalies described in the example of the location log, by referring to the location logs included in the log.

Furthermore, by referring to the control command and the location information from the same time, anomaly detector 104 can detect that vehicle 40 is being restrained by a third party as an anomaly when, despite "move backward" being executed as a control command in vehicle controller 303, the location information has not changed. In other words, anomaly detector 104 can determine whether there is a discrepancy between the control command and the location information for the same time and detect such a discrepancy as an anomaly.

Furthermore, by referring to the operation command and the control command from the same time, anomaly detector 104 can determine whether the operation command from the operator is being correctly executed in vehicle 40.

For example, at time T4, the operation command is "turn left", but the control command is "action C". This indicates that the operation command was tampered with by a malicious third party, in the communication path after the transmission of the operation command and before the execution of the control command, and action C was executed by vehicle 40 as a result. Anomaly detector 104 can detected the operation command and the control command not matching as an anomaly, for example.

In this manner, by obtaining the operation log, the control log, and the location log, anomaly detector 104 can detect anomalies which can be determined from a combination of at least two logs, in addition to anomalies which can be determined from an operation command alone, anomalies which can be determined from a control command alone, and anomalies which can be determined from location information alone.

The operation log and the control log may further contain hash values. For example, log collector 102 may collect hash values of operation logs and hash values of control logs. When a hash value is contained, a detailed detection, such as detecting an operation command for an operation not normally performed by the operator as an anomaly, cannot be made, but a determination as to whether the operation command and the control command match can be made, as described earlier. In other words, whether there is an anomaly in vehicle 40 can be determined from the hash value.

When logs are obtained by hash values, if detailed time information is included in the input of a hash function, the hash values of the operation log and the control log will not match due to communication latency. As such, for example, a group of operation commands for one minute (e.g., a period from 10:00 to 10:01) and a group of control commands for one minute (e.g., a period from 10:00 to 10:01) are used. For example, 0xABCD, which is a hash value for a group of operation commands obtained in period D1 (T1 T8), and 0xEFGH, which is a hash value for a group of control commands obtained in period D1, are obtained and stored. In the example in FIG. 8, the operation command and the control command at time T4 do not match, and thus the hash value of the group of operation commands and the hash value of the group of control commands do not match.

In this case, vehicle operation apparatus 20 and vehicle control apparatus 30 may store, in advance, a common hash function.

Note that anomaly monitoring apparatus 10 may collect a first operation log containing a hash value for an operation command of a first period from vehicle operation apparatus 20, collect a first control log containing a hash value for a control command of that first period from vehicle control apparatus 30, and if the hash values do not match (an example of a result of comparing), may further collect a second operation log containing an operation command of the first period from vehicle operation apparatus 20 and a second control log containing a control command of the first period from vehicle control apparatus 30. In this manner, anomaly monitoring apparatus 10 may be configured to determine whether there is an anomaly in vehicle 40 using the first operation log and the first control log, and identify the attack origin indicating the cause of the anomaly using the second operation log and the second control log.

Example of Anomaly Detection Rules

FIG. 9 is a diagram illustrating an example of anomaly detection rules according to the present embodiment. The anomaly detection rules shown in FIG. 9 are used when anomaly monitoring apparatus 10 detects an anomaly. For example, the anomaly detection rules are used when anomaly detector 104 of anomaly monitoring apparatus 10 detects an anomaly using the operation log, the control log, and the location log.

Each anomaly detection rule is configured including a number, a type, a rule, and an anomaly location. The number is an identification number of the anomaly detection rule; the type is the type of the log used to detect the anomaly; the rule is a condition for detection as an anomaly; and the anomaly location indicates the type of the log assumed to have the anomaly in the event that an anomaly has been detected. The log indicated by the anomaly location is an example of an anomaly log.

For example, the anomaly detection rule for number 1 describes a rule that uses the operation log and the control log to detect the operation command and the control command from the same time not matching as an anomaly, with the anomaly being determined to be present in the control log. The rules in FIG. 9 are examples of rules for detecting the anomalies described in the example of the operation log, the example of the control log, the example of the location log, and the example of the logs, respectively.

Additionally, for example, the anomaly detection rules for numbers 2 to 4 describe rules in which, in the operation log, an unauthorized operation command being input, a context (e.g., a state of vehicle 40) at the time of the operation command (when the operation command is executed) being different, and the operation command being different from usual behavior are detected as anomalies, with the anomalies being determined to be present in the operation log.

Additionally, for example, the anomaly detection rules for numbers 5 to 7 describe rules in which, in the control log, an unauthorized control command being input, a context (e.g., a state of vehicle 40) at the time of the control command (when the control command is executed) being different, and the control command being different from usual behavior are detected as anomalies, with the anomalies being determined to be present in the control log.

Additionally, for example, the anomaly detection rule for number 8 describes a rule in which, in the location log, movement of a distance exceeding the capabilities of vehicle 40 is detected as an anomaly, with the anomaly being determined to be present in the location log.

Additionally, for example, the anomaly detection rule for number 9 describes a rule that uses the control log and the location log to detect a change in the location information different from the control command as an anomaly, with the anomaly being determined to be present in the location log.

In this manner, by holding anomaly detection rules, anomaly detector 104 can detect an anomaly for each of the operation log, the control log, and the location log.

The anomaly detection rule is an example of a first rule for detecting an anomaly in each of the operation log and the control log. In the present embodiment, the anomaly detection rule includes information pertaining to the anomaly in the location log.

Note that the operation command and the control command from the same time not matching includes the hash value of the operation log and the hash value of the control log not matching. Anomaly detector 104 may detect an anomaly when the hash value of the operation log and the hash value of the control log do not match.

Example of Attack Origin Determination Rules

FIG. 10 is a diagram illustrating an example of attack origin determination rules according to the present embodiment. The attack origin determination rules shown in FIG. 10 are used when anomaly monitoring apparatus 10 determines the attack origin. For example, the attack origin determination rules are used by attack origin determiner 105 of anomaly monitoring apparatus 10 to identify the attack origin that caused the anomaly.

Each attack origin determination rule is configured including a number, a rule, and an attack origin. The number is an identification number of the attack origin determination rule, the rule is a condition for determining the attack origin, and the attack origin is the attack origin which is determined.

For example, with the attack origin determination rule for number 1, when the operation command and the control command from the same time do not match, the attack origin is determined to be a communication path. When the operation command and the control command do not match, it is highly likely that an operation command from the operator has been tampered with in the communication path between vehicle operation apparatus 20 and vehicle control apparatus 30 and executed in vehicle 40, and thus attack origin determiner 105 determines that the attack origin is the communication path (an example of a first attack origin) based on the attack origin determination rule shown in FIG. 10. The first attack origin is an attack origin in a case where a malicious operation command is assumed to have been inserted into the communication path between vehicle operation apparatus 20 and vehicle control apparatus 30. Note that the operation command and the control command from the same time not matching is an example of a result of comparing the operation log with the control log.

Additionally, for example, with the attack origin determination rule for number 2, when an anomaly occurs in both the operation log and the control log, the attack origin is determined to be the operator. When an anomaly is detected in both the operation log and the control log, it is highly likely that a malicious operator has input an anomalous operation command and an anomalous control command has been executed in vehicle 40, and thus attack origin determiner 105 determines that the attack origin is the operator (an example of a second attack origin) based on the attack origin determination rule shown in FIG. 10. The second attack origin is an attack origin in a case where the operator using vehicle operation apparatus 20 is assumed to have transmitted a malicious operation command. Note that an anomaly occurring in both the operation log and the control log is an example of a result of comparing the operation log with the control log.

Additionally, for example, with the attack origin determination rule for number 3, when an anomaly occurs in only the location log, the attack origin is determined to be close proximity. When an anomaly is detected in neither the operation log nor the control log, and is only detected in the location log, it is highly likely that a third party has physically approached vehicle 40 and caused an anomaly in vehicle 40, and thus attack origin determiner 105 determines that the attack origin is close proximity (an example of a third attack origin). The third attack origin is an attack origin in a case where vehicle control apparatus 30 is assumed to have been physically attacked. Note that an anomaly being detected in neither the operation log nor the control log, and being only detected in the location log, is an example of a result of comparing the operation log with the control log.

The attack origin determination rule is a rule used for identifying the attack origin, and is an example of a second rule. The attack origin determination rule includes information enabling the attack origin to be identified based on at least the operation log and the control log. For example, attack origin determiner 105 identifies the attack origin for an anomaly in vehicle 40 based on (i) the operation log and the control log and (ii) the attack origin determination rule. Note that in the present embodiment, the attack origin determination rule may further include information enabling the attack origin to be identified based on an anomaly in the location log.

Example of Anomaly Countermeasure Rules

FIG. 11 is a diagram illustrating an example of anomaly countermeasure rules according to the present embodiment. The anomaly countermeasure rules shown in FIG. 11 are used when an anomaly countermeasure is taken in vehicle operation apparatus 20 and vehicle control apparatus 30. For example, the anomaly detection rules are used for anomaly handler 206 of vehicle operation apparatus 20 and anomaly handler 308 of vehicle control apparatus 30 to take (execute) countermeasures for an anomaly.

Each anomaly countermeasure rule is configured including an attack origin and a rule. The attack origin is the type of the attack origin determined by attack origin determiner 105 of anomaly monitoring apparatus 10, and the rule describes the details of the countermeasure to be taken for that attack origin.

For example, when the attack origin is the communication path, with the anomaly countermeasure rules shown in FIG. 11, the attack is suppressed by stopping a remote control function of vehicle control apparatus 30 installed in vehicle 40 (an example of a countermeasure for the first attack origin). The countermeasure for the first attack origin can be realized by vehicle controller 303 rejecting an operation command from vehicle operation apparatus 20.

Additionally, for example, when the attack origin is the operator, with the anomaly countermeasure rules shown in FIG. 11, the attack is suppressed by revoking the operator's access permissions to vehicle operation apparatus 20 (an example of a countermeasure for the second attack origin). The countermeasure for the second attack origin can be realized by operation command inputter 202 rejecting an operation command from the operator.

Additionally, for example, when the attack origin is close proximity, with the anomaly countermeasure rules shown in FIG. 11, the attack is suppressed by making a warning to the periphery of vehicle control apparatus 30 using a warning alarm or the like (an example of a countermeasure for the third attack origin). The countermeasure for the third attack origin can be realized by anomaly handler 308 executing a warning operation.

In this manner, by using the anomaly countermeasure rules, at least one of anomaly handlers 206 and 308 can execute countermeasures according to the attack origin determined by attack origin determiner 105. Through this, anomaly handlers 206 and 308 can take countermeasures according to the cause, which makes it possible to provide vehicle 40 (an example of an autonomous mobility entity) capable of safer autonomous travel.

Vehicle Remote Operation Processing Sequence

Figure 12:
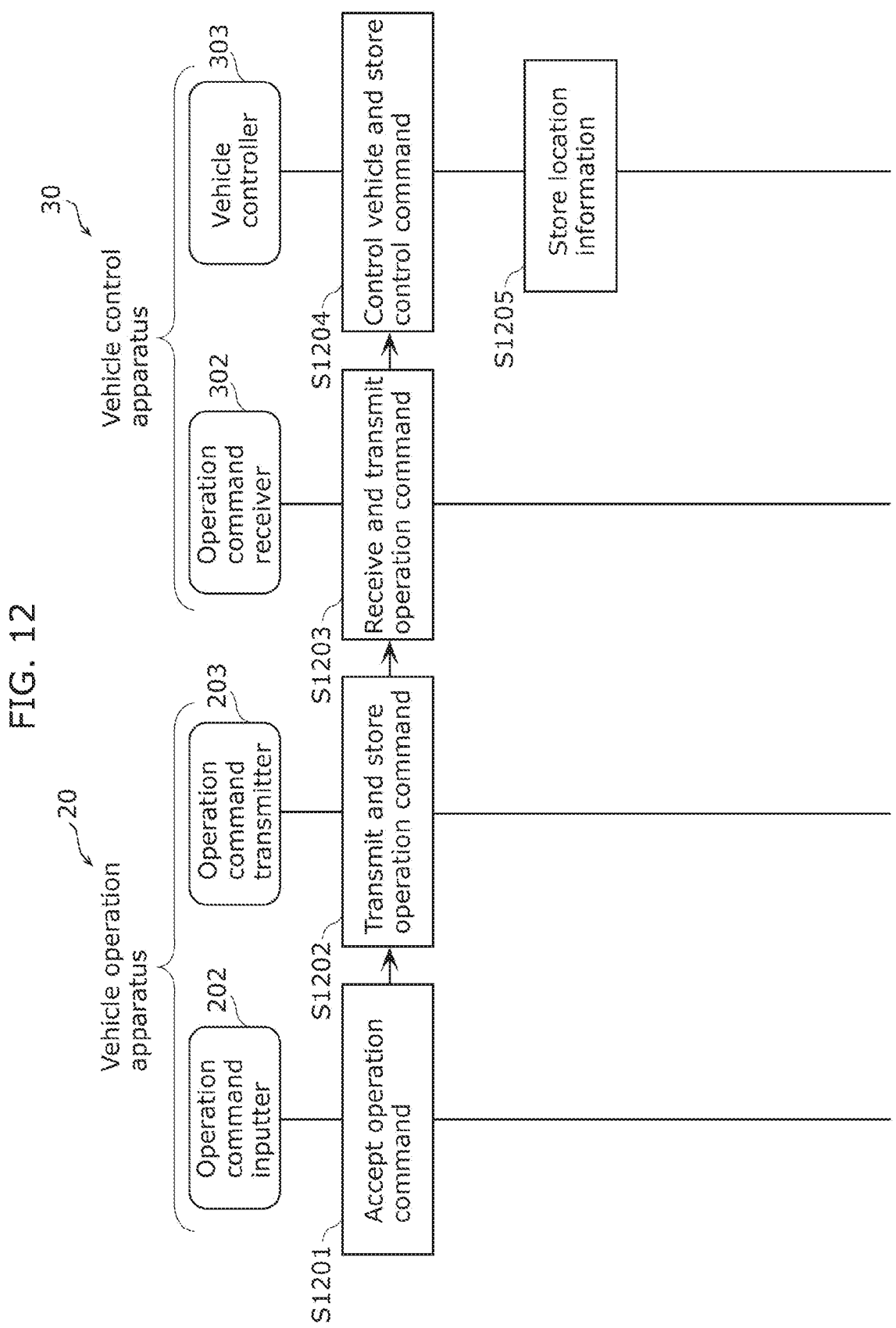
FIG. 12 is a diagram illustrating a vehicle remote operation processing sequence according to an embodiment.

FIG. 12 is a diagram illustrating a vehicle remote operation processing sequence according to the present embodiment. Specifically, FIG. 12 illustrates a processing sequence from when an operator inputs an operation command to when location information is stored after vehicle 40 is controlled by a control command based on that operation command.

(S1201) Operation command inputter 202 of vehicle operation apparatus 20 accepts the input of an operation command from the operator, and transmits the input operation command to operation command transmitter 203.

(S1202) Operation command transmitter 203 of vehicle operation apparatus 20 transmits the received operation command to operation command receiver 302, and stores the operation command, and the time the operation command was transmitted, in operation log storage 204.

(S1203) Operation command receiver 302 of vehicle control apparatus 30 transmits the received operation command to vehicle controller 303.

(S1204) Vehicle controller 303 of vehicle control apparatus 30 executes control of vehicle 40, using the received operation command as a control command, and stores the executed control command, and the time that control command was executed, in control log storage 304.

(S1205) Vehicle controller 303 of vehicle control apparatus 30 obtains the location information of vehicle 40 from a GPS or the like, and stores the location information, and the time the location information was obtained, in location log storage 305. The time the location information was obtained preferably includes the same time as the time the control command was executed. The location information may, for example, be obtained both before and after the control command is executed, or may be obtained while the control command is being executed.

Log Collection Processing Sequence

Figure 13:
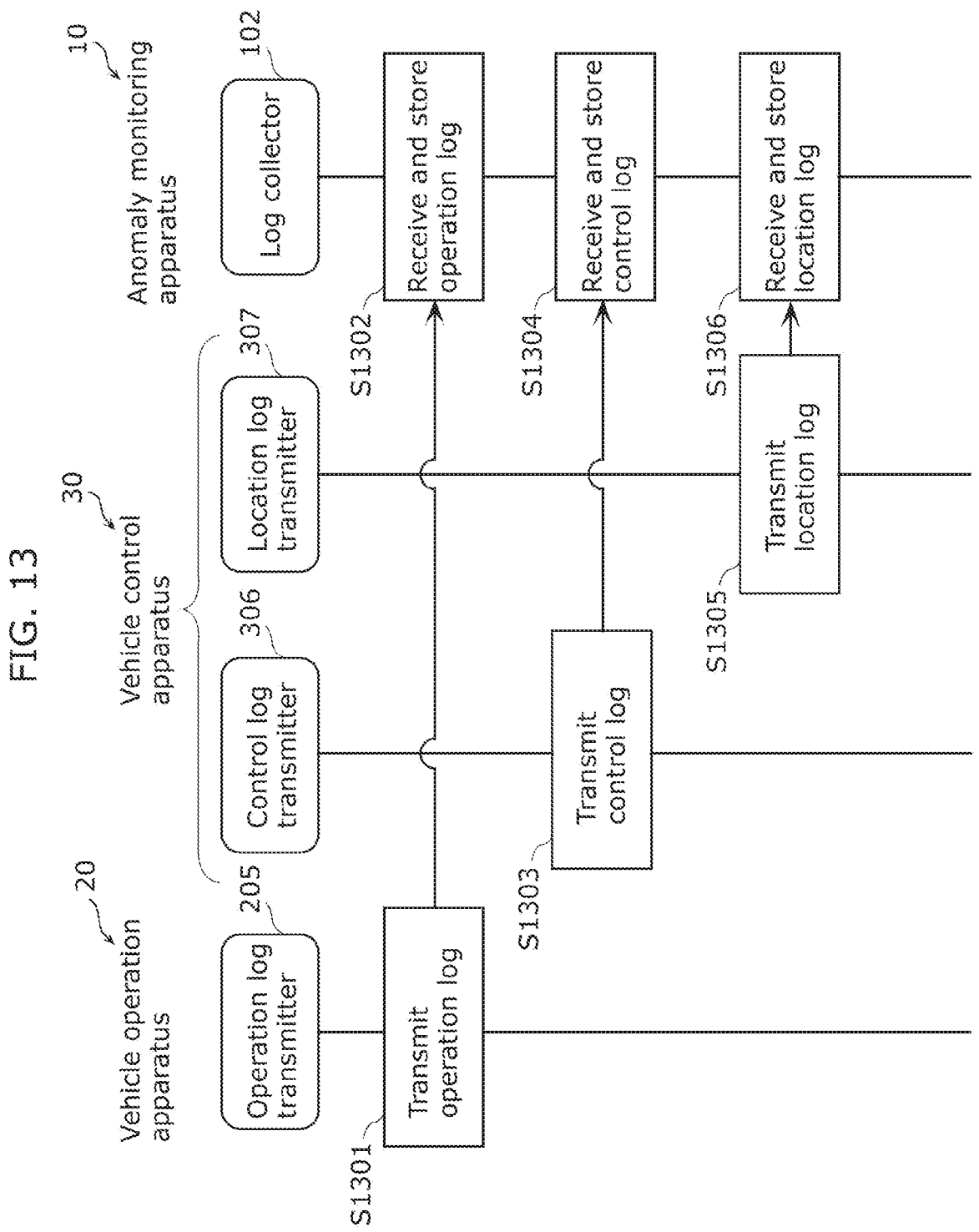
FIG. 13 is a diagram illustrating a log collection processing sequence according to an embodiment.

FIG. 13 is a diagram illustrating a log collection processing sequence according to the present embodiment. Specifically, FIG. 13 illustrates a processing sequence up to when log collector 102 collects and stores the operation log, the control log, and the location log.

(S1301) Operation log transmitter 205 transmits the operation log stored in operation log storage 204 to log collector 102.

(S1302) Log collector 102 stores the received operation log in log storage 103.

(S1303) Control log transmitter 306 transmits the control log stored in control log storage 304 to log collector 102.

(S1304) Log collector 102 stores the received control log in log storage 103.

(S1305) Location log transmitter 307 transmits the location log stored in location log storage 305 to log collector 102.

(S1306) Log collector 102 stores the received location log in log storage 103.

Here, operation log transmitter 205, control log transmitter 306, and location log transmitter 307 may transmit the logs to log collector 102 periodically, in accordance with a log storage capacity, or in response to instructions from log collector 102.

Additionally, as illustrated in FIG. 8, log collector 102 may store the received operation log, control log, and location log in log storage 103 in association with each of times.

Processing Sequence from Anomaly Detection to Anomaly Countermeasures

Figure 14:
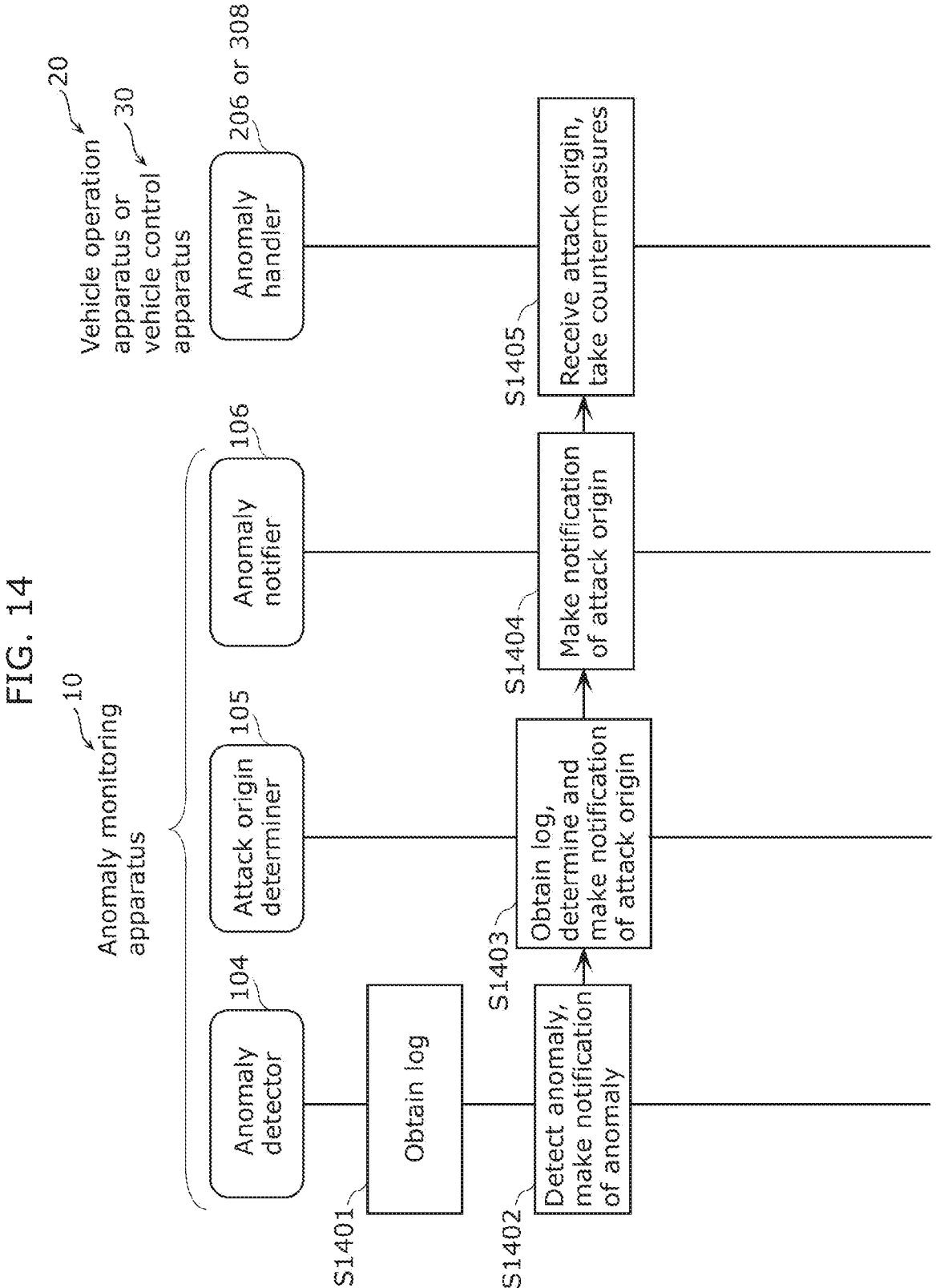
FIG. 14 is a diagram illustrating a processing sequence from anomaly detection to anomaly countermeasures according to an embodiment.

FIG. 14 is a diagram illustrating a processing sequence from anomaly detection to anomaly countermeasures according to the present embodiment. Specifically, FIG. 14 illustrates a processing sequence from when log collector 102 collects the operation log, the control log, and the location log to when anomaly detector 104 detects an anomaly, attack origin determiner 105 determines the attack origin, and anomaly handler 206 or anomaly handler 308 takes anomaly countermeasures.

(S1401) Anomaly detector 104 obtains the operation log, the control log, and the location log stored in log storage 103.

(S1402) Anomaly detector 104 detects an anomaly based on the anomaly detection rules (see FIG. 8, for example) and the operation log, the control log, and the location log. When an anomaly is detected, anomaly detector 104 notifies attack origin determiner 105 of the detected anomaly. Anomaly detector 104 may notify attack origin determiner 105 of at least one of which rule the anomaly was detected by or the anomaly location.

For example, when the operation command and the control command from the same time not matching is detected, anomaly detector 104 may notify attack origin determiner 105 both that an anomaly in which the operation command and the control command from the same time do not match has been detected and that the anomaly location is the control log. Note that the anomaly detection method will be described in detail later.

(S1403) When an anomaly is received, attack origin determiner 105 obtains the operation log, the control log, and the location log stored in log storage 103. Attack origin determiner 105 then determines the attack origin using the attack origin determination rules, and transmits the determined attack origin to anomaly notifier 106. The attack origin determination method will be described in detail later.

(S1404) Anomaly notifier 106 transmits the occurrence of the anomaly and the attack origin determined by attack origin determiner 105 to anomaly handler 206 or anomaly handler 308. For example, anomaly notifier 106 transmits the occurrence of the anomaly and the attack origin determined by attack origin determiner 105 to anomaly handler 308 when the attack origin is the communication path or close proximity, and transmits the occurrence of the anomaly and the attack origin determined by attack origin determiner 105 to anomaly handler 206 when the attack origin is the operator. Note that anomaly notifier 106 may, for example, transmit the occurrence of the anomaly and the attack origin determined by attack origin determiner 105 to both anomaly handler 206 and anomaly handler 308 regardless of the attack origin determined by attack origin determiner 105. Through this, anomaly notifier 106 can notify the operator that an anomaly is occurring in the communication path or at close proximity.

(S1405) Anomaly handler 206 or anomaly handler 308 takes a countermeasure according to the received attack origin using the anomaly countermeasure rules.

Anomaly Detection Processing Flowchart

FIG. 15 is a diagram illustrating a flowchart for anomaly detection processing according to the present embodiment.

(S1501) Anomaly detector 104 obtains the operation log, the control log, and the location log from log storage

103, and then executes step S1502. Step S1501 corresponds to step S1401 indicated in FIG. 14.

(S1502) Anomaly detector 104 determines whether there is an anomaly based on the logs obtained in step S1501 and the anomaly detection rules. When an anomaly is detected in at least one of the logs among the operation log, the control log, and the location log (Yes in S1502), anomaly detector 104 executes step S1503. However, when an anomaly is not detected (No in S1502), anomaly detector 104 ends the anomaly detection processing. Note that the details of the anomaly detection method are as described in the examples of the anomaly detection rules.

(S1503) Anomaly detector 104 determines that an anomaly is occurring in vehicle 40, notifies attack origin determiner 105 of the anomaly, and ends the anomaly detection processing.

Note that steps S1502 and S1503 correspond to S1402 indicated in FIG. 14.

As described above, anomaly detector 104 detects anomalies in the operation log, the control log, and the location log based on the anomaly detection rules (e.g., the anomaly detection rules shown in FIG. 9).

Attack Origin Determination Processing Flowchart

Figure 16:
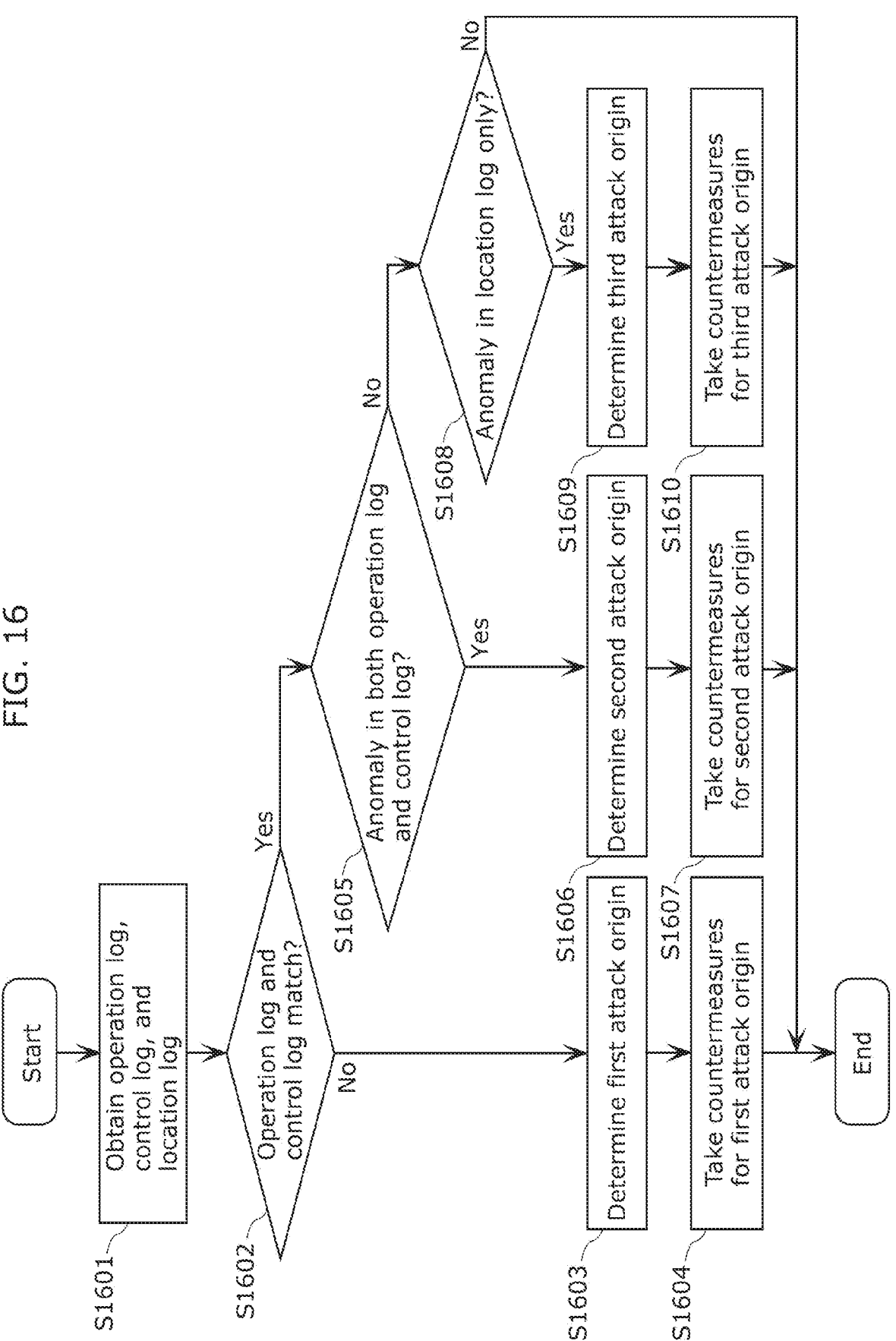
FIG. 16 is a diagram illustrating a flowchart for attack origin determination processing according to an embodiment.

FIG. 16 is a diagram illustrating a flowchart for attack origin determination processing according to the present embodiment. The processing illustrated in FIG. 16 is executed when the determination of step S1503 is made in FIG. 15.

(S1601) Attack origin determiner 105 obtains the operation log, the control log, and the location log, and then executes step S1602.

(S1602) Attack origin determiner 105 determines whether the operation log and the control log match. Attack origin determiner 105 compares the operation log with the control log, executes step S1603 if the logs do match (No in S1602), and executes step S1605 if the logs do match (Yes in S1602). Step S1602 is a determination of whether the rule for number 1 in FIG. 10 applies. Note that the operation log and the control log matching (a determination of Yes in S1602) means that the condition of number 1 in the attack origin determination rules shown in FIG. 10 is satisfied, whereas the operation log and the control log not matching (a determination of No in S1602) means that the condition of number 1 in the attack origin determination rules shown in FIG. 10 is not satisfied.

(S1603) When a determination of No is made in step S1602, attack origin determiner 105 determines that the attack origin is the first attack origin, which is the communication path, based on the attack origin determination rules shown in FIG. 10. In other words, based on the result of the determination in step S1602 (an example of a result of comparing), attack origin determiner 105 identifies the communication path (the first attack origin) as the attack origin, from among the plurality of attack origins indicated in the attack origin determination rules shown in FIG. 10. Attack origin determiner 105 then transmits a determination result indicating that a determination of No was made in step S1602 to anomaly handler 206 or anomaly handler 308. This makes it possible to execute step S1604.

(S1604) Upon receiving the determination result from attack origin determiner 105, anomaly handler 206 or anomaly handler 308 executes "stop remote control function of vehicle control apparatus 30" as the countermeasure for the first attack origin, based on the anomaly countermeasure rules shown in FIG. 11, and then ends the processing.

(S1605) When a determination of Yes is made in step S1602, attack origin determiner 105 further determines whether there is an anomaly in both the operation log and the control log. Attack origin determiner 105 confirms whether there is an anomaly in the operation log and whether there is an anomaly in the control log, executes step S1606 when there is an anomaly in both the operation log and the control log (Yes in S1605), and executes step S1608 when there is not an anomaly in both the operation log and the control log (No in S1605). Note that an anomaly being present in both the operation log and the control log (a determination of Yes in S1605) means that the condition of number 2 in the attack origin determination rules shown in FIG. 10 is satisfied, whereas an anomaly not being present in both the operation log and the control log (a determination of No in S1605) means that the condition of number 2 in the attack origin determination rules shown in FIG. 10 is not satisfied.

(S1606) When a determination of Yes is made in step S1605, attack origin determiner 105 determines that the attack origin is the second attack origin, which is the operator. Attack origin determiner 105 then transmits a determination result indicating that a determination of Yes was made in step S1605 to anomaly handler 206. This makes it possible to execute step S1607.

(S1607) Upon receiving the determination result from attack origin determiner 105, anomaly handler 206 executes "revoke operator's access permissions to vehicle operation apparatus 20" as the countermeasure for the second attack origin, based on the anomaly countermeasure rules shown in FIG. 11, and then ends the processing.

(S1608) When a determination of No is made in step S1605, attack origin determiner 105 further determines whether there is an anomaly in only the location log. Attack origin determiner 105 executes step S1609 when there is an anomaly in only the location log (Yes in S1608), and ends the processing when there is not an anomaly in only the location log (No in S1608). Note that an anomaly being present in only the location log (a determination of Yes in S1608) means that the condition of number 3 in the attack origin determination rules shown in FIG. 10 is satisfied, whereas an anomaly not being present in only the location log (a determination of No in S1608) means that the condition of number 3 in the attack origin determination rules shown in FIG. 10 is not satisfied.

(S1609) When a determination of Yes is made in step S1608, attack origin determiner 105 determines that the attack origin is the third attack origin, which is close proximity. Attack origin determiner 105 then transmits a determination result indicating that a determination of Yes was made in step S1608 to anomaly handler 308. This makes it possible to execute step S1610.

(S1610) Upon receiving the determination result from attack origin determiner 105, anomaly handler 308 executes "make warning to periphery of vehicle control apparatus 30" as the countermeasure for the third attack origin, based on the anomaly countermeasure rules shown in FIG. 11, and then ends the processing.

Note that steps S1601 to S1603, S1605, S1606, S1608, and S1609 correspond to step S1403 indicated in FIG. 14.

Additionally, steps S1604, S1607, and S1610 correspond to step S1405 indicated in FIG. 14.

As described thus far, attack origin determiner 105 identifies the attack origin that caused the anomaly in vehicle 40 as the first attack origin from the plurality of attack origins when the operation log and the control log do not match, and identifies the attack origin that caused the anomaly in vehicle 40 as the second attack origin, which is different from the first attack origin, from the plurality of attack origins when an anomaly is detected in both the operation log and the control log. Additionally, attack origin determiner 105 identifies the third attack origin, which is different from the first attack origin and the second attack origin, from the plurality of attack origins when an anomaly is present in only the location log.

Then, at least one of anomaly handlers 206 and 308 may stop the remote control function of vehicle control apparatus 30 when the attack origin is determined to be the first attack origin, revoke the operator's access permissions to vehicle operation apparatus 20 when the attack origin is determined to be the second attack origin, and make a warning to the periphery of vehicle control apparatus 30 when the attack origin is determined to be the third attack origin.

Through this, by collecting and comparing the control log of vehicle 40 with the operation log of the operator, anomaly monitoring apparatus 10 can determine whether the cause of the anomaly in vehicle 40 is a cyber attack or an anomalous operation by the operator. Anomaly monitoring apparatus 10 can then cause effective countermeasures to be taken according to the cause of the anomaly. Thus, according to anomaly monitoring apparatus 10, safer autonomous mobility can be provided.

Note that although attack origin determiner 105 makes the determinations of steps S1602, S1605, and S1608 in that order, the order is not limited thereto.

OTHER EMBODIMENTS

As described thus far, an embodiment has been given as an example of the technique according to the present disclosure. However, the technique in the present disclosure is not limited thereto, and can also be applied in embodiments in which modifications, replacements, additions, or omissions have been made as appropriate. For example, variations such as those described below are also included in the embodiments of the present disclosure.

(1) Although the foregoing embodiment is described as a security countermeasure taken in an automobile, this technique is not limited to this application. The technique is not limited to automobiles, and can be applied in any mobility entities, such as construction equipment, agricultural equipment, ships, rail cars, aircraft (e.g., airplanes and drones), and the like. In other words, the mobility entity is not limited to vehicles including automobiles, and may also include construction equipment, agricultural equipment, ships, rail cars, airplanes, and the like. The mobility entity may also be capable of fully automatic driving, or may be switchable between automatic driving and manual driving.

(2) Some or all of the constituent elements constituting the devices in the foregoing embodiment may be implemented by a single integrated circuit through system LSI (Large-Scale Integration). "System LSI" refers to very-large-scale integration in which multiple constituent elements are integrated on a single chip, and specifically, refers to a computer system configured including a microprocessor, read-only memory (ROM), random access memory (RAM), and the like. A computer program is recorded in the RAM. The system LSI circuit realizes the functions of the devices by the microprocessor operating in accordance with the computer program. The units of the constituent elements constituting the foregoing devices may be implemented individually as single chips, or may be implemented with a single chip including some or all of the devices. Although the term "system LSI" is used here, other names, such as IC, LSI, super LSI, ultra LSI, and so on may be used, depending on the level of integration. Furthermore, the method for implementing the integrated circuit is not limited to LSI; the circuit may be implemented through a dedicated circuit, a generic processor, or the like. An FPGA (Field Programmable Gate Array) capable of post-production programming or a reconfigurable processor in which the connections and settings of the circuit cells within the LSI can be reconfigured may be used as well. Furthermore, should technology for implementing integrated circuits that can replace LSI appear due to advancements in semiconductor technology or the appearance of different technologies, the integration of the above function blocks may be performed using such technology. Biotechnology applications are one such foreseeable example.

(3) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(4) As one aspect of the present disclosure, the anomaly detection method may be a program (a computer program) that implements these methods on a computer, or a digital signal constituting the computer program. Additionally, one aspect of the present disclosure may be a computer program or a digital signal recorded in a computer-readable recording medium such as a flexible disk, hard disk, CD-ROM, MO, DVD, DVD-ROM, DVD-RAM, BD (Blu-ray (registered trademark) Disc), semiconductor memory, or the like. The constituent elements may also be the digital signals recorded in such a recording medium. Additionally, one aspect of the present disclosure may be realized by transmitting the computer program or digital signal via a telecommunication line, a wireless or wired communication line, a network such as the Internet, a data broadcast, or the like. Additionally, one aspect of the present disclosure may be a computer system including a microprocessor and memory, where the memory records the above-described computer program and the microprocessor operates in accordance with the computer program. Additionally, the present disclosure may be implemented by another independent computer system, by recording the program or the digital signal in the recording medium and transferring the recording medium, or by transferring the program or the digital signal over the network or the like.

(5) Additionally, the divisions of the function blocks in the block diagrams are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

The anomaly monitoring apparatus according to the foregoing embodiment and the like may be realized as a single apparatus, or as a plurality of apparatuses. When the anomaly monitoring apparatus is realized as a plurality of apparatuses, the constituent elements of the anomaly monitoring apparatus may be distributed throughout the plurality of apparatuses in any manner. When the anomaly monitoring apparatus is realized as a plurality of apparatuses, the communication method used among the plurality of apparatuses is not particularly limited, and may be wireless communication or wired communication. A combination of wireless communication and wired communication may also be used among the apparatuses.

Additionally, some of the functions of each of the constituent elements in the anomaly monitoring apparatus may be provided in at least one of the vehicle operation apparatus or the vehicle control apparatus. For example, the vehicle operation apparatus may have a function for detecting anomalies in the operation log. In this case, information pertaining to operations for which the operator does not have permissions may be stored in advance in the vehicle operation apparatus. Additionally, for example, the vehicle control apparatus may have a function for detecting anomalies in the control log. In this case, the vehicle control apparatus may store, in advance, information pertaining to the travel capabilities of the vehicle in which that vehicle control apparatus is installed (e.g., catalog values).

Additionally, the anomaly monitoring apparatus may have some of the functions of each constituent element included in at least one of the vehicle operation apparatus or the vehicle control apparatus. For example, the anomaly monitoring apparatus may have a function for determining the details of countermeasures, among the functions of the anomaly handlers included in the vehicle operation apparatus and the vehicle control apparatus. In other words, the anomaly monitoring apparatus may determine the countermeasures for anomalies taken by each of the vehicle operation apparatus and the vehicle control apparatus. In this case, the anomaly monitoring apparatus may store the anomaly countermeasure rules (e.g., the anomaly countermeasure rules illustrated in FIG. 11) in advance.

(6) Additionally, when one vehicle operation apparatus controls a plurality of vehicle control apparatuses (i.e., a plurality of vehicles), and the attack origin is identified as the operator based on (i) the operation log and (ii) the control log of at least one vehicle control apparatus among the plurality of vehicle control apparatuses, the anomaly monitoring apparatus according to the foregoing embodiment may revoke access permissions to the vehicle operation apparatus for remotely operating the other vehicle control apparatuses.

(7) Additionally, although the foregoing embodiment describes the anomaly detector as detecting the anomaly location (the log which has an anomaly) using the anomaly detection rules, the method for detecting the anomaly location is not limited thereto. The anomaly detector may detect the anomaly location using a trained machine learning model which takes the operation logs and control logs as input information and outputs the anomaly location, for example.

(8) The orders in which the steps in the flowcharts are performed are for describing the present disclosure in detail, and other orders may be used instead. Some of the above-described steps may be executed simultaneously (in parallel) with other steps, and some of the above-described steps may not be executed.

(9) Although the foregoing embodiment described an example in which the operation log and the control log contain hash values in addition to commands, it is sufficient for only hash values to be contained. This makes it possible to compare the operation log and the control log efficiently while suppressing the communication volume when collecting the operation log and the control log.

(10) Although the foregoing embodiment described an example of three attack origins, namely "communication path", "operator", and "close proximity", other attack origins may be included as well. Additionally, the number of attack origins is not particularly limited to two or more.

(11) Aspects realized by combining the constituent elements and functions described in the foregoing embodiment and variations as desired are also included in the scope of the present disclosure. For example, variations on the present embodiment conceived by one skilled in the art, embodiments implemented by combining constituent elements from different other embodiments, and the like may be included as well in the present disclosure as long as they do not depart from the essential spirit of the present disclosure.

INDUSTRIAL APPLICABILITY

The present disclosure is useful in remote operation systems that remotely operate mobility entities.

The invention claimed is:

1. An anomaly monitoring apparatus in a remote operation system for remotely operating a mobility entity, the anomaly monitoring apparatus comprising:
   a processor;
   a memory;
   a log collector that:
      collects an operation log from an operation apparatus which remotely operates the mobility entity and a control log from a control apparatus installed in the mobility entity, the operation log being a history of operation commands, and the control log being a history of control commands; and
      collects a location log from the control apparatus, the location log being a history of location information of the mobility entity;
   an anomaly detector that detects whether an anomaly is present in the mobility entity based on at least one of the operation log or the control log;
   an attack origin identifier that, when the anomaly detector detects an anomaly, identifies an attack origin that caused the anomaly in the mobility entity from among a plurality of attack origins based on a result of comparing the operation log with the control log; and
   an anomaly notifier that makes a notification for taking a countermeasure for the attack origin identified by the attack origin identifier,
   wherein
   the anomaly notifier provides the notification to a periphery of the control apparatus upon a detection of occupancy by a driver in the mobile entity, the attack origin includes a location where an attack that caused the anomaly in the mobility entity was performed, the anomaly detector detects a presence or absence of an anomaly in each of the operation log and the control log based on a first rule, the first rule further includes information pertaining to an anomaly in the location log, the anomaly detector detects an anomaly in each of the operation log, the control log, and the location log based on the first rule, the attack origin identifier identifies a second attack origin, different from a first attack origin, as the attack origin when an anomaly is present in only the location log, the first attack origin being the attack origin when the operation log and the control log do not match, and the log collector, the anomaly detector, the attack origin identifier, and the anomaly notifier are software instructions stored in the memory and executed by the processor.

2. The anomaly monitoring apparatus according to claim 1,
   wherein the attack origin identifier further identifies a third attack origin, different from the first attack origin, as the attack origin when an anomaly is detected in both the operation log and the control log.

3. The anomaly monitoring apparatus according to claim 2,
   wherein the first attack origin includes a malicious operation command being inserted into a communication path between the operation apparatus and the control apparatus,
   the third attack origin includes an operator, who uses the operation apparatus, transmitting a malicious operation command,
   the second attack origin includes a third party physically attacking the mobility entity, and
   the anomaly notifier stops a remote control function of the control apparatus when the attack origin is determined to be the first attack origin, revokes access permission of the operator to the operation apparatus when the attack origin is determined to be the third attack origin, and makes a notification for performing a warning to a periphery of the control apparatus when the attack origin is determined to be the second attack origin.

4. The anomaly monitoring apparatus according to claim 1,
   wherein the log collector further collects a hash value of the operation log and a hash value of the control log, and
   the anomaly detector detects an anomaly when the hash value of the operation log and the hash value of the control log do not match.

5. The anomaly monitoring apparatus according to claim 2,
   wherein the first rule includes information indicating that an anomaly is present in the control log when the operation log and the control log do not match.

6. The anomaly monitoring apparatus according to claim 2,
   wherein the first rule includes information indicating that an anomaly is present in the location log when the location log includes information indicating a change in the location information that is different from the control log.

7. The anomaly monitoring apparatus according to claim 1, wherein the attack origin identifier identifies an attack origin that caused the anomaly in the mobility entity based on (i) the operation log and the control log and (ii) a second rule, and the second rule includes (i) the attack origin being a communication path between the operation apparatus and the control apparatus when the operation command and the control command from an identical time do not match and (ii) the attack origin being an operator using the operation apparatus when an anomaly is detected in both the operation log and the control log.

8. An anomaly monitoring method performed in a remote operation system for remotely operating a mobility entity, the anomaly monitoring method comprising:

collecting, via a processor and in a memory, an operation log from an operation apparatus which remotely operates the mobility entity and which is installed in the mobility entity, and a control log from a vehicle control apparatus, the operation log being a history of operation commands, and the control log being a history of control commands;

collecting, via the processor and in the memory, a location log from the control apparatus, the location log being a history of location information of the mobility entity;

detecting, via the processor, whether an anomaly is present in the mobility entity based on at least one of the operation log or the control log;

identifying, when an anomaly is detected in the detecting and by the processor, an attack origin that caused the anomaly in the mobility entity from among a plurality of attack origins based on a result of comparing the operation log with the control log;

making, via the processor, a notification for taking a countermeasure for the attack origin identified in the identifying, to cause the mobility entity to take the countermeasure for the attack origin; and providing the notification to a periphery of the control apparatus upon a detection of occupancy by a driver in the mobile entity, wherein the attack origin includes a location where an attack that caused the anomaly in the mobility entity was performed, and the anomaly monitoring method further comprises:

detecting a presence or absence of an anomaly in each of the operation log and the control log based on a first rule, the first rule further includes information pertaining to an anomaly in the location log, detecting an anomaly in each of the operation log, the control log, and the location log based on the first rule, and identifying a second attack origin, different from a first attack origin, as the attack origin when an anomaly is present in only the location log, the first attack origin being the attack origin when the operation log and the control log do not match.

\* \* \* \* \*